US007886076B2

United States Patent
Brabson

(10) Patent No.: US 7,886,076 B2
(45) Date of Patent: Feb. 8, 2011

(54) BYPASSING ROUTING STACKS USING MOBILE INTERNET PROTOCOL

(75) Inventor: Roy F. Brabson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1794 days.

(21) Appl. No.: 11/033,947

(22) Filed: Jan. 12, 2005

(65) Prior Publication Data

US 2006/0155801 A1 Jul. 13, 2006

(51) Int. Cl.
G06F 15/173 (2006.01)
(52) U.S. Cl. .................................. 709/238; 709/227
(58) Field of Classification Search ................. 709/227, 709/238
See application file for complete search history.

(56) References Cited

U.S. PATENT DOCUMENTS

| | | | |
|---|---|---|---|
| 5,774,660 A | 6/1998 | Brendel | |
| 6,128,279 A | 10/2000 | O'Neil | |
| 6,947,401 B2 * | 9/2005 | El-Malki et al. | 370/338 |
| 7,162,529 B2 * | 1/2007 | Morishige et al. | 709/230 |
| 7,305,429 B2 * | 12/2007 | Borella | 709/226 |
| 7,539,773 B2 * | 5/2009 | Akisada et al. | 709/245 |
| 7,552,234 B2 * | 6/2009 | Thubert et al. | 709/238 |
| 7,657,653 B2 * | 2/2010 | Takeyoshi et al. | 709/242 |
| 7,760,674 B2 * | 7/2010 | Oishi et al. | 370/466 |
| 2002/0080752 A1 | 6/2002 | Johansson et al. | |
| 2003/0018810 A1 * | 1/2003 | Karagiannis et al. | 709/238 |
| 2003/0093553 A1 * | 5/2003 | Le et al. | 709/238 |
| 2003/0233471 A1 * | 12/2003 | Mitchell et al. | 709/238 |
| 2004/0260745 A1 | 12/2004 | Gage et al. | |
| 2007/0081512 A1 * | 4/2007 | Takeda et al. | 370/349 |
| 2008/0239963 A1 * | 10/2008 | Brabson | 370/235 |

OTHER PUBLICATIONS

Perkins, Charles E.; Johnson, David B.; Mobility Support in IPv6; 1996; MOBICOM; pp. 27-37.*
Johnson, et. al.; Mobility Support in IPv6; RFC 3775; Jun. 2004; Network Working Group; pp. 1-111.*
Feng, Yanjun et al, "Load Balancing based on pseudo-Anycast and pseudo-Mobility in Ipv6," Communication Technology Proceedings 2003, ICCT 2003. International Conference on Apr. 9-11, 2003, Piscataway, NJ, USA, IEEE, vol. 1, Apr. 9, 2003, pp. 348-352.
Feng, Yanjun, et al., "Load Balancing Based on Pseudo-Anycast and Pseudo-Mobility in IPv6", Proceedings of ICCT2003 (pp. 348-352).

(Continued)

Primary Examiner—Asad M Nawaz
Assistant Examiner—Oleg Survillo
(74) Attorney, Agent, or Firm—Steven M. Greenberg, Esq.; Carey Rodriguez Greenberg & Paul LLP

(57) ABSTRACT

Methods, systems and computer program products for load balancing using Mobile Internet Protocol (IP) Version 6 are provided. A request for a connection is received from a client at a routing stack. A Mobile IP Version 6 Binding Update message is transmitted from the routing stack to the client responsive to the received request. The Binding Update message identifies a selected target stack so as to allow the client to communicate directly with the target stack bypassing the routing stack.

1 Claim, 8 Drawing Sheets

OTHER PUBLICATIONS

Heissenhuber, F. et al., "Home Agent Redundancy and Load Balancing in Mobile Ipv6," in Proceedings BC '99, Broadband Communications, Hong Kong, China, pp. 235-244, Nov. 1999.

"High Availability and Failover," Chapter 14 from Oracle Internet Directory Administrator's Guide, Release 2.0.6, © 1999 Oracle Corporation.

"P333R-LB Load Balancing Stackable Switch Product Summary," located at http://www.avaya.com/ac/common/index.jhtml?location=M1H1005G1006F2025 . . . on Oct. 11, 2004, © 2004 Avaya Inc., 2 pages.

Pai, V.S. et al., "Locality-Aware Request Distribution in Cluster-based Network Servers," in *Proceedings of the 8th ACM Conference on Architectural Support for Programming Languages and Operating Systems*, pp. 205-216, San Jose, CA, Oct. 1998.

\* cited by examiner

BYPASSING ROUTING STACKS USING MOBILE INTERNET PROTOCOL

FIELD OF THE INVENTION

This invention relates to methods, systems and computer program products related to workload balancing and, more particularly, to methods, systems and computer program products for workload balancing using mobile internet protocol.

BACKGROUND OF THE INVENTION

The Internet Protocol ("IP") is designed as a connectionless protocol. Therefore, IP workload balancing solutions may treat every Transmission Control Protocol ("TCP") connection request to a particular application, identified by a particular destination IP address and port number combination, as independent of all other such TCP connection requests. Examples of such IP workload balancing systems include Sysplex Distributor from the International Business Machines Corporation ("IBM"), which is included in IBM's z/OS and OS/390 TCP/IP implementations, and the Multi-Node Load Balancer ("MNLB") from Cisco Systems, Inc. Thus, the Sysplex Distributor is the strategic load balancing solution for z/OS. In other words, the Sysplex Distributor may distribute new client connection requests sent to a single IP address to one or more different application servers on different TCP/IP stacks.

Sysplex Distributor consists of two functions, a routing stack and one or more target stacks. The routing stack may be configured to process new connection requests and select a target stack to handle the new request. The routing stack typically keeps track of the selected target stack for each connection request and routes subsequent packets for the same TCP connection to the same target stack. Sysplex Distributor may also maintain a connection routing table for active connections. A connection entry may be created when a connection is established and the connection entry may be removed when the connection is terminated.

Traffic sent from the application server on the target stack to the client typically uses the most efficient route available and may bypass the routing stack completely. By default, traffic sent from the client to the application server must typically traverse the routing stack. The routing stack in turn forwards the data over internal coupling facility (XCF) links to the appropriate target stack.

Sysplex Distributor may also work in conjunction with Cisco Forwarding Agents. When used in this mode, the Cisco Forwarding Agents may intercept new connection requests and forward them to the routing stack. The routing stack may select the optimal target stack to process the new connection request and return the IP address of the target stack to the Cisco Forwarding Agent. The Cisco Forwarding Agent may then forward the connection request and subsequent packets for this connection to the selected target stack, typically using Generic Routing Encapsulation (GRE) tunneling, although MultiProtocol Label Switching (MPLS) may also be used.

Use of Cisco Forwarding Agents and XCF links may not be desirable. For example, sending the connection requests and data packets over XCF links may add delay. Furthermore, the communication between the Cisco Forwarding Agents and the routing stacks may also add delay and reduce the scalability of the system. Accordingly, improved methods of load balancing may be desired.

SUMMARY OF EMBODIMENTS OF THE INVENTION

Some embodiments of the present invention provide methods, systems and computer program products for load balancing using Mobile Internet Protocol (IP) Version 6. A request for a connection is received from a client at a routing stack. A Mobile IP Version 6 Binding Update message is transmitted from the routing stack to the client responsive to the received request. The Binding Update message identifies a selected target stack so as to allow the client to communicate directly with the target stack bypassing the routing stack.

In further embodiments of the present invention, the Binding Update message may include a home address of the connection as an internet protocol address associated with the routing stack and a care-of address of the connection as an internet protocol address (IP) address associated with the target stack. Thus, the client can create a binding cache entry that maps the IP address associated with the routing stack to the IP address associated with the target stack. In certain embodiments of the present invention, the IP address associated with the routing stack is a virtual IP address (VIPA).

In still further embodiments of the present invention, the request for the connection to the selected target stack may be transmitted from the routing stack to the target stack. A notification may be received at the routing stack from the target stack that the connection request has been accepted by the target stack. A routing table at the routing stack may be updated. In certain embodiment of the present invention, the routing stack may be updated to indicate that the target stack has accepted the connection request responsive to the received notification.

In some embodiments of the present invention, a Mobile IP Version 6 Home Test Init message may be transmitted from the routing stack to the client. The Home Test Init message may include a request that the client return a Mobile IP Version 6 Home Test message to the routing stack. The Home Test message may be received at the routing stack from the client responsive to the transmitted Home Test Init message. A Mobile IP Version 6 Care-of Test Init message may be transmitted from the routing stack or the target stack to the client for the target stack. A source IP address of the Care-of Test Init message may be set to the IP address of the target stack.

In further embodiments of the present invention, a Care-of Test message may be received at the target stack from the client. The Care-of Test message may include a mobility header indicating that a copy of the Care-of Test message should be forwarded to the routing stack. The copy of the Care-of Test message may be transmitted to from the target stack to the routing stack. The connection may be established at the client between the client, the routing stack and the target stack so as to allow direct communication between the client and the target stack. An indication may be transmitted from the client to the routing stack that the connection has been established.

In still further embodiments of the present invention, the transmitted indication may be received at the routing stack and forwarded to the target stack. The Binding Update message may be transmitted to the client once both the Care-of Test message and the Home Test message have been received at the routing stack. The Binding Update message may be a first Binding Update message and a second Binding Update message may be received from the routing stack at the client. The second Binding Update message may indicate that the established connection should be terminated. The binding cache entry associated with the connection may be deleted at the client responsive to second Binding Update message.

In some embodiments of the present invention, the binding cache entry may be created at the client that maps the home address to the care-of address so as to allow direct communication between the client and the target stack. A binding acknowledgment may be transmitted from the client directly to the target stack bypassing the routing stack. A copy of the binding acknowledgment may be received at the routing stack from the target stack. A routing table associated with the routing stack may be updated to include state information. A binding information request may be transmitted from the routing stack to the target stack including the state information so as to allow the target stack to update a routing table associated with the target stack.

In further embodiments of the present invention, mobile IP version 6 messages may be received at the routing stack from the target stack so as to allow the routing stack to maintain a routing table associated with the routing stack that is substantially similar to a routing table associated with the target stack. In certain embodiments of the present invention, the Mobile IP Version 6 optimizations may be enabled on the VIPA. Methods, systems and computer program products according to embodiments of the present invention may be implemented using Z/OS Version 1 Revision 6.

In some embodiments of the present invention, a notification of a new connection request at the target stack from the client may be received at the routing stack. Binding Update message information associated with the connection may be copied at the routing stack from a routing table associated with the routing stack.

In further embodiments of the present invention, the Binding Update message may be a first Binding Update message. A notification of a new connection request at the client from the target stack may be received at the routing stack. It may be determined if an entry for the new connection exists in the routing table at the routing stack. Binding Update message information associated with the existing connection may be copied from the routing table if it is determined that the entry exists. A second Binding Update message may be transmitted from the routing stack to the client if it is determined that the entry does not exist. The second Binding Update message may identify a second selected target stack for the new connection so as to allow the client to communicate directly with the second selected target stack bypassing the routing stack.

In still further embodiments of the present invention, a binding refresh request may be transmitted from the client to the target stack. The binding refresh request may include a request to send another Binding Update message from the target stack.

In some embodiments of the present invention, the Binding Update message may be a first Binding Update message. A problem with the target stack may be detected at the routing stack. The binding cache entry may be deleted at the client responsive to the detected problem. A second Binding Update message may be transmitted from the routing stack to the client. The second Binding Update message may indicate that the care-of address and the home address should both be set to the VIPA so as to allow direct communication between the client and the routing stack.

In further embodiments of the present invention, the Binding Update message may include a first Binding Update message. A second Binding Update message may be transmitted, from the routing stack, to the client so as to allow deletion of the binding cache entry at the client.

Still further embodiments of the present invention provide methods, systems and computer program products for load balancing using Mobile Internet Protocol (IP) Version 6. A Mobile IP Version 6 Binding Update message is received from the routing stack at the client responsive to a request for a connection. The Binding Update message identifies a selected target stack so as to allow the client to communicate directly with the selected target stack bypassing the routing stack.

Some embodiments of the present invention provide methods, systems and computer program products for load balancing using Mobile Internet Protocol (IP) Version 6. A request for a connection to a selected target stack is received at the selected target stack from a routing stack. A notification indicating that the connection request has been accepted by the target stack is transmitted from the selected target stack so as to allow a client to communicate directly with the selected target stack bypassing the routing stack.

BRIEF DESCRIPTION THE DRAWINGS

DETAILED DESCRIPTION OF EMBODIMENTS OF THE INVENTION

Figure 1:
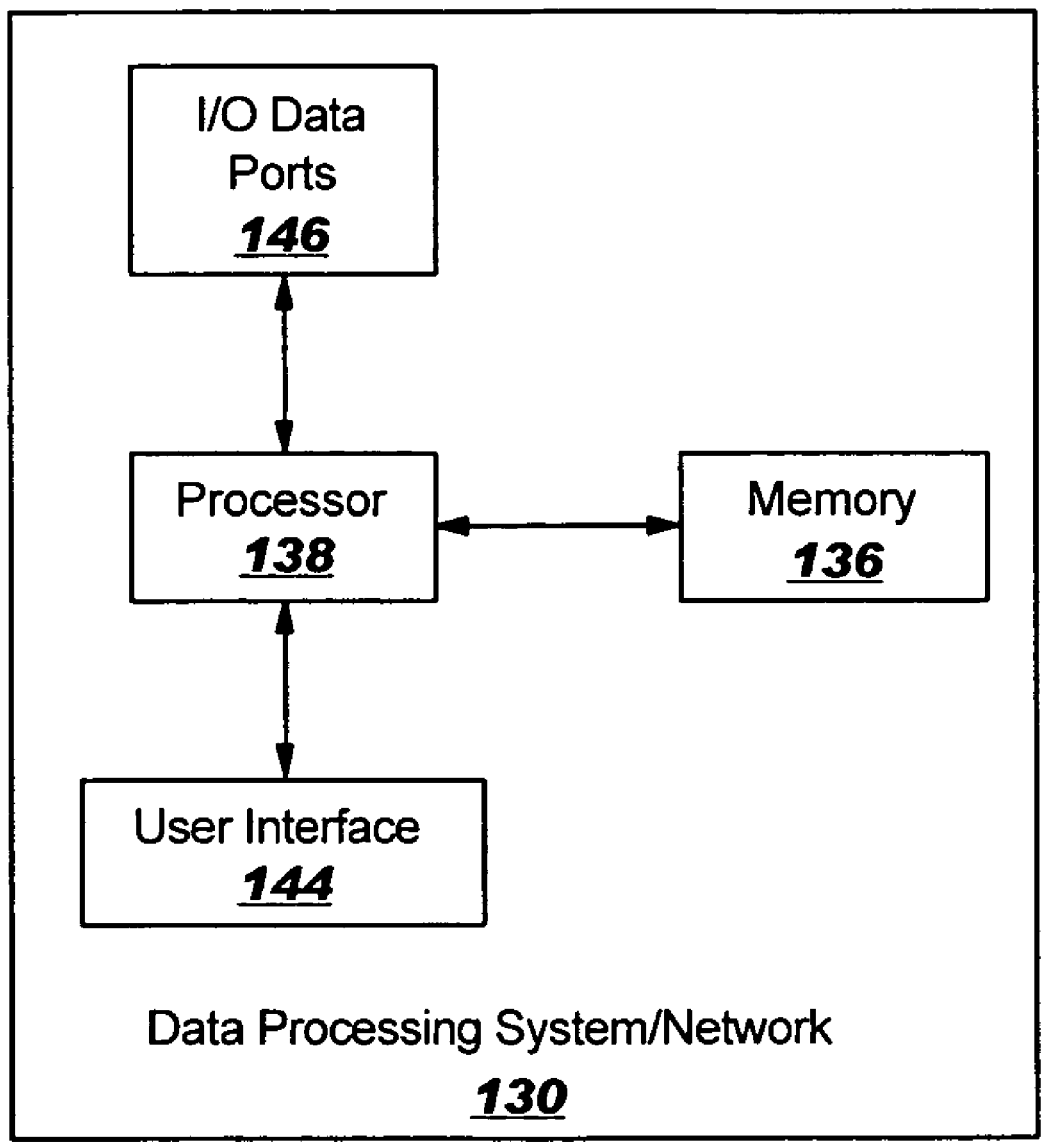
FIG. 1 is a block diagram of a data processing system suitable for use in some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated selectivity features, integers, steps, operations, elements, and/or components, but do not preclude the presence or addition of one or more other selectivity features, integers, steps, operations, elements, components, and/or groups thereof. As used herein the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

The routing stack may receive new connection requests, select the optimal target stack and send the connection request and subsequent data packets to the selected target stack. As with Mobile IP Version 4 the routing stack may send the connection request and data packets over XCF links. As discussed above, the use of XCF links and Cisco forwarding Agents may add unwanted delay to the system. Furthermore, unlike Mobile IP Version 4, Cisco Forwarding Agents do not support Mobile IP Version 6. Mobile IP Version 6 is advantageous as it offers many more addresses than Mobile IP Version 4. Thus, Cisco Forwarding Agents cannot be used by the routing stacks in combination with Mobile IP Version 6. As a result, the routing stack must process all connection requests and data packets and forward client traffic over XCF links to the appropriate target stack.

Furthermore, the are two main issues with the Sysplex Distributor support added in z/OS Version 1 Revision 6. First, the routing stack processes and forwards all inbound data packets sent from the client to the target stack (as Cisco Forwarding Agents do not support Mobile IP Version 6). This adds an extra hop in the data path and consumes additional central processing unit (CPU) cycles at the routing stack. Second, all traffic sent from the client to the target stack traverses the XCF links. As discussed above, the use of Cisco Forwarding Agents and XCF links do not provide optimal performance.

Thus, embodiments of the present invention that will be discussed with respect to FIGS. 1 through 12, provide methods, systems and computer program products for load balancing using Mobile Internet Protocol (IP) Version 6. In other words, according to some embodiments of the present invention Mobile IP Version 6 concepts are used to allow a client to send data packets directly to a target stack, completely bypassing the routing stack. A brief overview of Mobile IP Version 6 will now be discussed. It will be understood that the overview provided herein is not a complete overview of the protocol function. Mobility Support in IP Version 6 (RFC 3775) provides a more complete description of the Mobile IP Version 6 protocol.

A mobile node is typically expected to be addressable at its home address, whether it is currently attached to its home link or is away from home. As used herein, the "home address" is an IP address assigned to the mobile node within its home subnet prefix on its home link. When a mobile node is at home, packets addressed to its home address are routed to the mobile node's home link, using conventional Internet routing mechanisms known to those having skill in the art.

On the other hand, when a mobile node is attached to some foreign link away from home, it is also addressable at one or more care-of addresses. As used herein, a "care-of address" is an IP address associated with a mobile node that has the subnet prefix of a particular foreign link. The mobile node can acquire its care-of address through conventional IP Version 6 mechanisms, such as stateless or stateful auto-configuration. As long as the mobile node stays in this location, packets addressed to this care-of address will be routed to the mobile node. The mobile node may also accept packets from several care-of addresses, such as when it is moving but still reachable at the previous link.

The association between a mobile node's home address and care-of address is known as a "binding" for the mobile node. While away from home, a mobile node registers its primary care-of address with a router on its home link, requesting this router to function as the "home agent" for the mobile node. The mobile node performs this binding registration by sending a "Binding Update message" to the home agent. The home agent replies to the mobile node by returning a "binding acknowledgement" message.

Any node communicating with a mobile node is referred to herein as a "correspondent node" of the mobile node, and may itself be either a stationary node or a mobile node. Mobile nodes can provide information about their current location to correspondent nodes. For example, the mobile node can provide information about their current location using the correspondent registration. A return routability test may be performed in order to authorize the establishment of the binding.

There are two possible modes for communications between the mobile node and a correspondent node. The first mode, bidirectional tunneling, does not typically require Mobile IP Version 6 support from the correspondent node and is available even if the mobile node has not registered its current binding with the correspondent node. Packets from the correspondent node are routed to the home agent and then tunneled to the mobile node. Packets to the correspondent node are tunneled from the mobile node to the home agent ("reverse tunneled") and then routed normally from the home network to the correspondent node. In this mode, the home agent uses proxy Neighbor Discovery to intercept any IP Version 6 packets addressed to the mobile node's home address (or home addresses) on the home link. Each intercepted packet is tunneled to the mobile node's primary care-of address. This tunneling is performed using IP Version 6 encapsulation.

The second mode, "route optimization", typically requires the mobile node to register its current binding at the correspondent node. Packets from the correspondent node can be routed directly to the care-of address of the mobile node. When sending a packet to any IP Version 6 destination, the correspondent node checks its cached bindings for an entry for the packet's destination address. If a cached binding for this destination address is found, the node uses a new Type 2 IP Version 6 routing header (Source Address and Destination Address) to route the packet to the mobile node by way of the care-of address indicated in this binding.

Routing packets directly to the mobile node's care-of address may allow the shortest communication path to be used. It may also eliminate congestion at the mobile node's home agent and home link. In addition, the impact of any possible failure of the home agent or networks on the path to or from it is reduced.

When routing packets directly to the mobile node, the correspondent node sets the Destination Address in the IP Version 6 header to the care-of address of the mobile node. A new Type 2 IP Version 6 routing header is also added to the packet to carry the desired home address. Similarly, the mobile node sets the source address in the packet's IP Version 6 header to its current care-of addresses. The mobile node adds a new IP Version 6 "Home Address" destination option to carry its home address. The inclusion of home addresses in these packets makes the use of the care-of address transparent above the network layer, for example, at the transport layer.

Mobile IP Version 6 also provides support for multiple home agents, and a limited support for the reconfiguration of the home network. In these cases, the mobile node may not know the IP address of its own home agent, and even the home subnet prefixes may change over time. A mechanism, known as "dynamic home agent address discovery" allows a mobile node to dynamically discover the IP address of a home agent on its home link, even when the mobile node is away from home. Mobile nodes can also learn new information about home subnet prefixes through the "mobile prefix discovery" mechanism.

Mobile IP Version 6 uses a Return Routability Procedure to allow the correspondent node to obtain some reasonable assurance that the mobile node is in fact addressable at its claimed care-of address as well as at its home address. Only with this assurance is the correspondent node able to accept Binding Update messages from the mobile node, which would then instruct the correspondent node to direct that mobile node's data traffic to its claimed care-of address.

For example, testing may be performed to determine whether packets addressed to the two claimed addresses are routed to the mobile node. The mobile node can typically pass the test only if it is able to supply proof that it received certain data (the "keygen tokens"), which the correspondent node transmits to those addresses. This data is combined by the mobile node into a binding management key, denoted Kbm.

The home and Care-of Test Init messages are sent at the same time. The procedure requires very little processing at the correspondent node, and the home and Care-of Test messages can be returned quickly, perhaps nearly simultaneously. Four messages form the return routability procedure, Home Test Init message, Care-of Test Init message, Home Test message and Care-of Test message.

Referring first to the Home Test Init message, a mobile node transmits a Home Test Init message to the correspondent node (via the home agent) to acquire the home keygen token. The contents of the message may include a source address which may be equal to home address, a destination address which may be equal to correspondent, parameters and a home init cookie. The Home Test Init message conveys the mobile node's home address to the correspondent node. The mobile node also transmits along a home init cookie that the correspondent node returns later. The Home Test Init message is reverse tunneled through the home agent. It will be understood that the headers and addresses related to reverse tunneling have been omitted from the above discussion of the message contents. The mobile node remembers these cookie values to obtain some assurance that its protocol messages are being processed by the desired correspondent node.

Referring now to the Care-of Test Init message, the mobile node transmits a Care-of Test Init message to the correspondent node (directly, not via the home agent) to acquire the care of keygen token. The contents of this message may include a source address, which may be equal to a care-of address, a destination address that may be equal to a correspondent, parameters and a care of init cookie. The Care-of Test Init message conveys the mobile node's care-of address to the correspondent node. The mobile node also transmits along a care of init cookie that the correspondent node returns later. The Care-of Test Init message is sent directly to the correspondent node.

Referring now to the Home Test message, the Home Test message is sent in response to a Home Test Init message. It is sent via the home agent. The contents of the message may include a source address which may be equal to the correspondent, a destination address which may be equal to a home address, parameters, a home init cookie, a home keygen token and a home nonce index. The Home Test message is sent to the mobile node via the home network, where it is presumed that the home agent will tunnel the message to the mobile node. This means that the mobile node needs to already have sent a Binding Update message to the home agent, so that the home agent will have received and authorized the new care-of address for the mobile node before the return routability procedure. For improved security, the data passed between the home agent and the mobile node is made immune to inspection and passive attacks. Such protection may be gained by encrypting the home keygen token as it is tunneled from the home agent to the mobile node.

The home init cookie from the mobile node is returned in the Home Test message, to ensure that the message comes from a node on the route between the home agent and the correspondent node. The home nonce index is delivered to the mobile node to later allow the correspondent node to efficiently find the nonce value that it used in creating the home keygen token.

Referring now to the Care-of Test message, the Care-of Test message is sent in response to a Care-of Test Init message. This message is not sent via the home agent, it is sent directly to the mobile node. The contents of the message may include a source address, which may be equal to the correspondent, a destination address which may be equal to the care-of address, parameters, care of init cookie, care of keygen token and care of nonce index.

When the mobile node has received both the home and Care-of Test messages, the return routability procedure is complete. As a result of the procedure, the mobile node has the data it needs to send a Binding Update message to the correspondent node. Binding Update messages may also be used to delete a previously established binding.

Thus, according to some embodiments of the present invention, which will be discussed below with respect to FIGS. 1 through 12, Mobile IP Version 6 concepts may map to IBM's Sysplex Distributor. For example, a client may assume a Correspondent Node role, a routing stack may assume a Home Agent role and a target stack may assume the Mobile Node role. Thus, instead of a mobile client roaming from one local area network (LAN) to another, Mobile IP Version 6 moves the dynamic virtual Internet protocol address (DVIPA) from the routing stack to the target stack as discussed further herein. It will be understood that although embodiments of the present invention are discussed herein with respect to DVIPAs and VIPAs, embodiments of the present invention are not limited to this configuration. Any addressing scheme known to those having skill in the art may be used without departing from the teachings of the present invention. For example, any IP address may be used.

Some embodiments of the present invention will now be discussed with respect to FIGS. 1 through 12. Referring now to FIG. 1, an exemplary embodiment of a computing device, for example, a client, a routing stack, a target stack or the like or data processing system 130 configured in accordance with some embodiments of the present invention will be discussed. The data processing system 130, which may be incorporated in, for example, a personal computer, a PDA, a wireless terminal/phone, or the like, may include a user interface 144, including, for example, input device(s) such as a keyboard or keypad, a display, a speaker and/or microphone, and a memory 136 that communicate with a processor 138. The data processing system 130 may further include an I/O data port(s) 146 that also communicates with the processor 138. The I/O data ports 146 can be used to transfer information between the data processing system 130 and another computer system or a network using, for example, an Internet Protocol (IP) connection. These components may be conventional components such as those used in many conventional data processing systems, which may be configured to operate as described herein.

Figure 2:
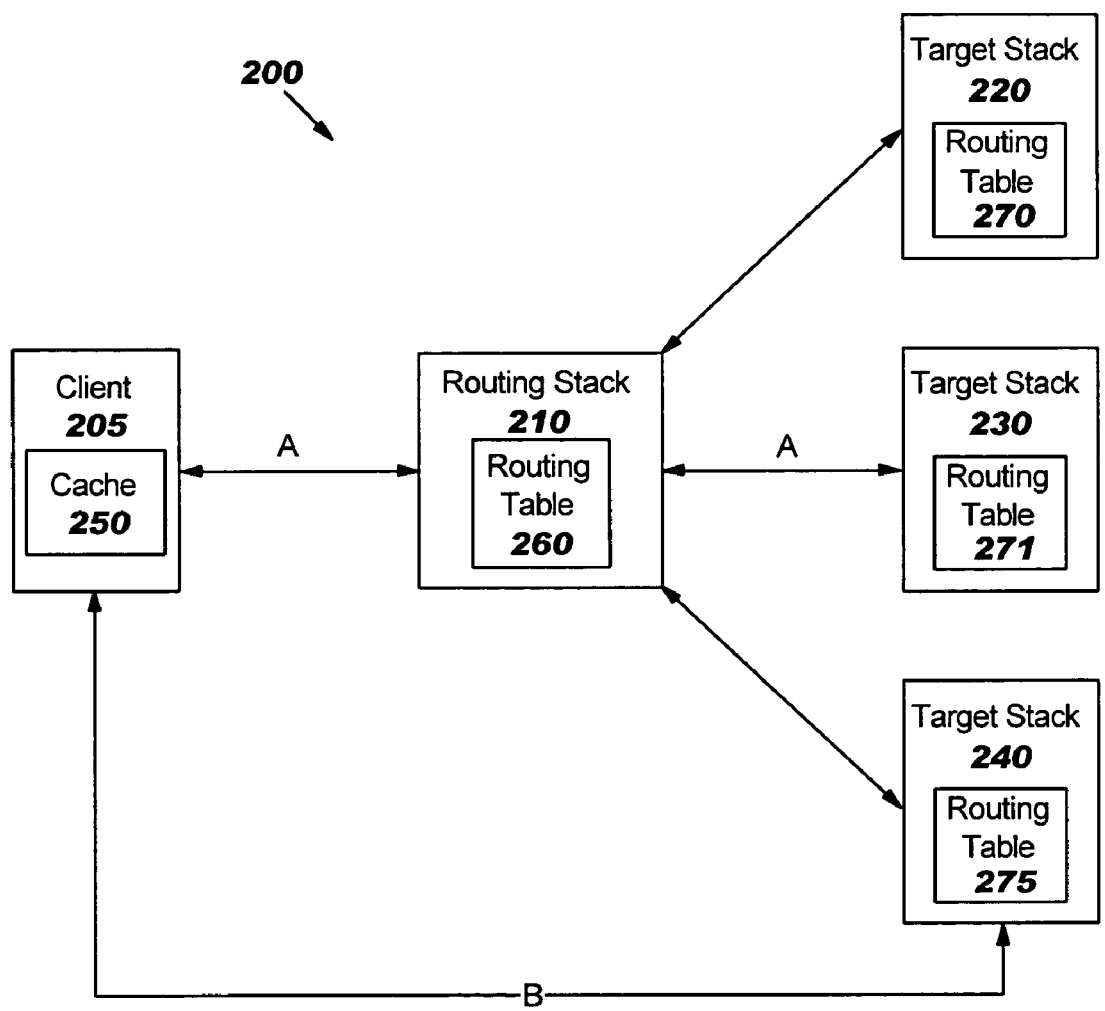
FIG. 2 is a block diagram of a system according to some embodiments of the present invention.

Referring now to FIG. 2, a block diagram of a system including one or more clients, routing stacks and/or target stacks according to some embodiments of the present invention will be discussed. It will be understood that each of the blocks of the system 200 may include one or more of the elements discussed above with respect to FIG. 1, for example, I/O Data ports 146, a processor 138, a memory 136 and a user interface 144. It will be further understood that clients, routing stacks, target stacks and the like are well known to those having skill in the art and, thus, only details relevant to embodiments of the present invention will be discussed in detail herein.

As illustrated in FIG. 2, the system 200 includes a client 205, a routing stack 210 and first, second and third target stacks 220, 230 and 240. It will be understood that although FIG. 2 only includes a single client, a single routing stack and a three targets stacks, embodiments of the present invention are not limited to this configuration. For example, multiple clients, multiple routing stacks and less than two or more than three target stacks may be provided without departing from the scope of the present invention. In some embodiments of the present invention, the system 200 may be, for example, z/OS Version 1 Revision 6.

To provide load balancing using Mobile Internet Protocol (IP) Version 6, the routing stack 210 may be configured to receive a request for a connection from the client 205 over a connection A. A Mobile IP Version 6 "Binding Update message", discussed above, may be transmitted to the client 205 responsive to the received request for the connection. The Binding Update message may identify a selected target stack (220, 230, 240) with which the client 205 may communicate directly, bypassing the routing stack according to some embodiments of the present invention discussed herein. The Binding Update message may identify a "home address" of the connection as, for example, a virtual internet protocol address (VIPA) associated with the routing stack 210 and a "care-of address" of the connection as, for example, an internet protocol address (IP) address associated with the target stack 240. For exemplary purposes, the third target stack 240 will be used as the selected target stack herein. The client 205 creates a binding cache entry that maps the home address of the VIPA to the care-of address of the selected target stack 240. Thus, the client 205 may communicate directly with the selected target stack 240 over path B instead of through the routing stack 210 using paths A. Accordingly, the delays caused by Cisco Routing Agents and XCFs may not be experienced according to some embodiments of the present invention.

As illustrated in FIG. 2, the client maintains a cache memory 250 in which it may store binding cache entries that map the home address to the care-of address, i.e., the virtual internet protocol address (VIPA) associated with the routing stack to the internet protocol address (IP) address associated with the target stack. The routing stack 210 and the target stacks 220, 230 and 240 each maintain a routing table 260, 270, 273 and 275 therein. The routing table of the routing stack 210 and the selected target stack 240 may be the same in case of a failure of the target stack 240, the routing stack 210 can resume control.

According to some embodiments of the present invention the routing stack 210 includes almost all the required Mobile IP Version 6 support. For example, the routing stack may be Interactive Network Dispatcher (IND), running on Linux on zSeries. Linux on zSeries includes Mobile IP Version 6 support, which may reduce the overall cost of adding this support. The routing stack 210 processes any Mobile IP Version 6 flows forwarded by a target stack 220, 230 and 240 as if the client had sent them. In other words, the routing stack 210 is configured to send Mobile IP Version 6 flows on behalf of the target stack 220, 230 and 240 and to process the responses as well.

The routing stack 210 manages the connection table (routing table 260) using the source and destination IP address pair (a 2-tuple not a 4-tuple, which also includes port numbers). The routing stack 210 may be configured to select, whenever possible, the same target stack 220, 230 and 240 for all connections from a particular client to a particular DVIPA.

The routing stack 210 may be configured to detect the case when a single client 205 establishes parallel connections to the same DVIPA and the connections are routed to two or more target stacks 220, 230 and 240. When this occurs, the routing stack may delete the binding cache entry 250 at the client 205. This aspect of embodiments of the present invention will be discussed further below.

When a connection terminates, the routing stack may be configured to request that the client 205 delete the Binding Cache Entry associated with the connection on the client 205. The routing stack 210 may be configured to delay sending the request until any timed affinity between the client 205 and the Target Stack 220, 230 and 240 expires.

When a Target Stack fails, the routing stack 210 may be configured to request that the client 205 delete all Binding Cache entries on the client that have a care-of address associated with the selected target stack 220, 230 and 240. When the routing stack transmits a Binding Update message, the routing stack 210 may be configured to store the last used sequence number in the coupling facility (XCF). A backup routing stack may use the sequence number if the primary routing stack 210 fails which will be discussed further below.

The target stack 220, 230 and 240 may be configured to forward packets that contain a mobility header to the routing stack 210 so as to allow the routing stack to maintain all necessary information in case the target stack fails 220, 230 and 240. A mobility header indicates that a copy of the Care-of Test message should be forwarded to the routing stack 210. If the packet also contains data in addition to the mobility header the target stack 220, 230 and 240 may be configured to process the data as well. The target stack 220, 230 and 240 may be configured to process packets that contain a Type 2 routing header (source address and destination address) for existing connections.

For example, if the target stack 220, 230 and 240 receives a new connection request for a DVIPA from a client 205, the connection request contains a Type 2 Routing Header and an application is listening on the target port, the target stack 220, 230 and 240 may be configured to accept the new connection request. The target stack 220, 230 and 240 may be configured to notify the routing stack of the new connection.

Furthermore, if the target stack receives a new connection request for a DVIPA from a client 205, the connection request contains a Type 2 routing header and an application is not listening on the target port, the target stack may be configured to forward the connection request to the routing stack.

Finally, if the target stack 220, 230 and 240 receives a packet other than a new connection request that contains a Type 2 routing header and the target stack 220, 230 and 240 does not know about the connection, the target stack 220, 230 and 240 may be configured to forward the packet to the routing stack 210.

It will be understood that embodiments of the present invention discussed herein may be implemented if Mobile IP Version 6 route optimizations have been enabled for the DVIPA and the target stack supports Mobile IP Version 6 route optimizations. If the target stack does not support Mobile IPv6 route optimizations, or if Mobile IP Version 6 route optimizations are not enabled for the DVIPA, the routing stack may continue to select target stacks for new connection requests using conventional methods known to those having skill in the art.

Figure 3:
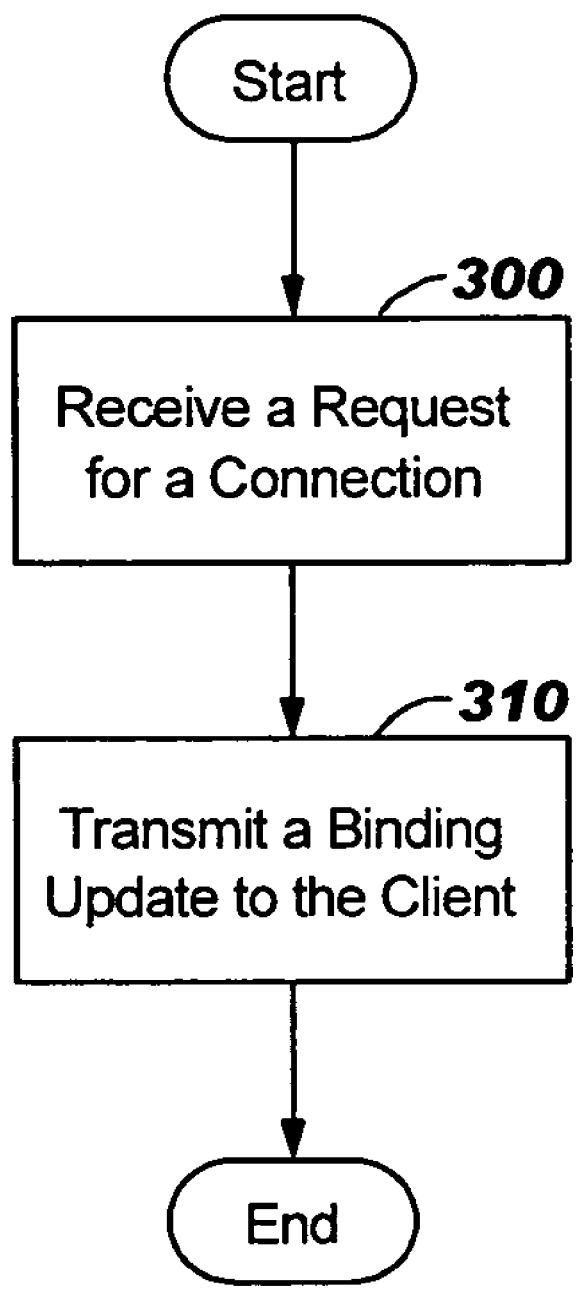
FIG. 3 is a flowchart illustrating operations according to some embodiments of the present invention.

Operations according to some embodiments of the present invention will now be discussed with respect to the flowchart of FIG. 3. As illustrated in FIG. 3, operations begin at block 300 by receiving a request for a connection at a routing stack from a client. A Mobile IP Version 6 Binding Update message is transmitted to the client responsive to the received request (block 310). The Binding Update message identifies a selected target stack so as to allow the client to communicate directly with the target stack bypassing the routing stack as illustrated, for example, by path B in FIG. 2. The Binding Update message may identify a home address of the connection as a virtual internet protocol address (VIPA) associated with the routing stack and a care-of address of the connection as an internet protocol address (IP) address associated with the target stack so as to allow the client to create a binding cache entry that maps the home address (VIPA) to the care-of address (IP address).

Figure 4:
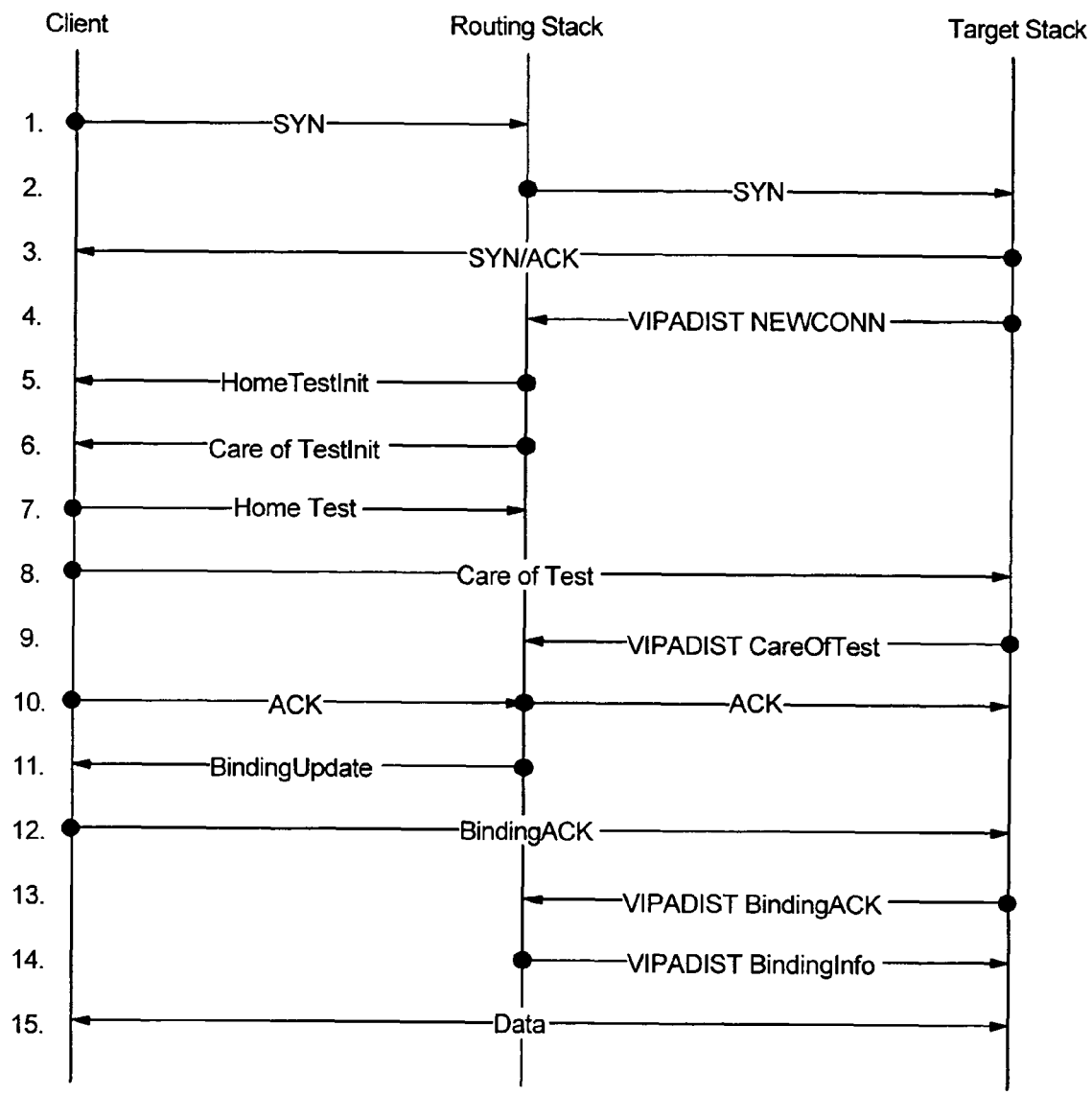
FIGS. 4 through 12 are flow diagrams illustrating operations according to some embodiments of the present invention.

More specific scenarios according to some embodiments of the present invention will now be discussed with respect to the flow diagrams of FIGS. 4 through 12. Referring now to FIG. 4, the process of establishing an initial inbound connection according to embodiments of the present invention will be discussed. When the routing stack receives a connection request from a client that is not in its connection table (routing table), the routing stack selects a target stack. The process through which a routing stack selects a target stack is known to those having skill in the art and will not be discussed further herein. The routing stack creates a routing table entry that maps the client IP address and DVIPA pair (source and destination address) to the IP address of the target stack and stores the routing table entry in the coupling facility. The routing stack then proceeds to send a Binding Update message to the client. Once the client receives and processes the Binding Update message, the client transmits subsequent IP packets directly to the target stack bypassing the routing stack.

The routing stack according to some embodiments of the present invention may be configured to select the same target stack for parallel connections from the same client. If the routing stack has an entry in the routing table for the client IP address and DVIPA, the routing stack may select the same target stack for new connection requests. However, it is possible that the client may connect to the same DVIPA using a different source IP address. In this case, the routing stack may not know this is a parallel connection from the client to the same DVIPA. This scenario will be discussed further below with respect to the flow diagram of FIG. 9.

As illustrated in FIG. 4, when the routing stack receives a new connection request (flow 1), the routing stack checks its connection routing table to determine if there is an existing connection from the same client IP address. If there is an existing connection, the routing stack transmits the connection request to the same Target Stack as the existing connection(s). If it is determined that there is not an existing entry in the routing table, as is the case with the flow illustrated in FIG. 4, the routing stack selects a new target stack, creates a new entry in its routing table for the new connection and forwards the connection request to the selected target stack (flow 2).

The target stack receives and processes the connection request and returns an acknowledgement to the client (flow 3). The target stack creates an entry in its copy of the routing table for the new connection. The Target Stack also notifies the routing stack that it has received and accepted the connection request (flow 4). Upon receipt of the notification, for example, VIPADIST NEWCONN, the routing stack updates its routing table to indicate the target stack has accepted the new connection.

At this point the routing stack is configured to send a Binding Update message to the client so as to allow redirection of the data from the client to the selected target stack. However, before sending a Binding Update message, the routing stack must receive a Home Test message and a Care-of Test message. Thus, the routing stack transmits a Home Test Init message to the client (flow 5), requesting the client send a Home Test message to the routing stack. The routing stack sets the source IP address on the Home Test Init message to the DVIPA.

The routing stack also transmits the Care-of Test Init message to the client on behalf of the Target Stack (flow 6). It will be understood that in some embodiments of the present invention the target stack may transmit the Care-of Test Init message without departing from the scope of the present invention. The routing stack sets the source IP address on the Care-of Test Init message to the IP address of the target stack. The client receives the Home Test Init message and responds with a Home Test message (flow 7). The client transmits the Home Test message to the Routing stack using the DVIPA as the destination IP address.

The client receives the Care-of Test Init message and responds with a Care-of Test message (flow 8). The client transmits the Care-of Test message to the Target Stack using the IP address of the target stack as the destination IP address. The Target Stack receives the Care-of Test message. Because the packet contains a mobility header, the target stack forwards the packet to the routing stack for processing (flow 9). If a TCP header is also present, the target stack will also process the data received in the packet.

The client completes the three-way handshake and establishes the TCP connection. Since the client has not received a Binding Update message, the client transmits the acknowledgement to the routing stack (flow 10). The routing stack forwards the acknowledgement to the target stack (flow 10). Once the routing stack has received the Home Test message and Care-of Test messages, it transmits a Binding Update message to the client (flow 11). The Binding Update message specifies the DVIPA as the home address and the IP address of the Target Stack as the care-of address.

The client creates or updates its binding cache entry for the DVIPA, mapping the DVIPA to the IP address of the target stack. The routing stack requests the client respond with a binding acknowledgement, which the client does (flow 12). The client transmits the binding acknowledgement to the care-of address in the binding cache, in this example, the IP address of the target stack (flow 12). The target stack receives the binding acknowledgement and since the IP packet contains a mobility header, the target stack forwards a copy to the routing stack (flow 13). If the IP packet contains a TCP header, the target stack also processes the data in the IP packet.

The Routing stack updates its routing table entry to include the state information necessary to send Binding Update messages to the client. The routing stack transmits a VIPADIST Binding Info request (flow 14) to the target Stack with this state information. The target stack updates its routing table entry to include the Binding Update message state information so that it matches the entry in the routing table associated with the routing stack. Once the client processes the Binding Update message, the client may transmit data directly to the target stack (flow 15) bypassing the routing stack. In some embodiments of the present invention, the packets sent by the client may contain a Type 2 routing header that contains the DVIPA as the final destination.

Figure 5:
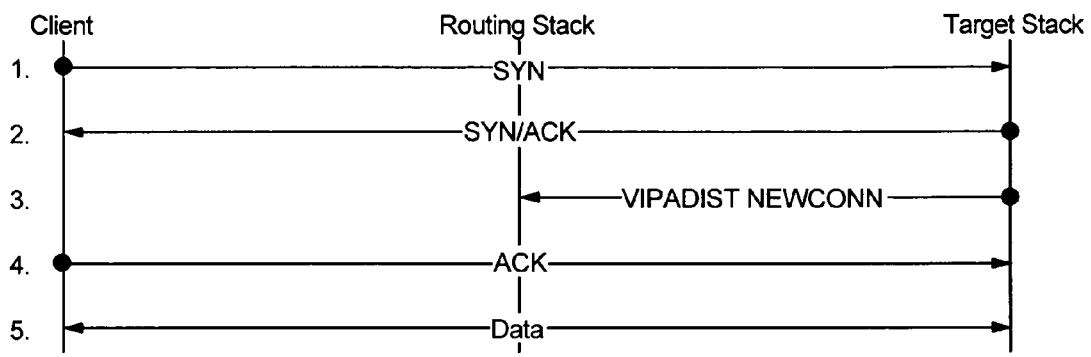

Referring now to FIG. 5, a flow diagram illustrating operations for handling subsequent inbound connections according to some embodiments of the present invention will be discussed. Once a client receives and processes a Binding Update message, the client transmits all subsequent packets to the target stack until the binding cache entry expires or the routing stack explicitly deletes the binding cache entry. This includes packets for existing connections as well as new connection requests.

Since the routing stack does not receive the new connection request, the target stack is configured to notify the target stack of the new connection request. In many ways, this is similar to how the Target Stack notifies the routing stack of new outbound connection requests.

When the client wishes to establish a new connection to an application listening on the DVIPA and has a binding cache entry for the DVIPA that has a care-of address for the target stack, the client transmits the new connection request directly to the target stack (flow 1). The target stack receives the connection request. Because this is a new connection request that contains a Type 2 routing header, the target stack processes the connection request. The target stack receives and processes the connection request and returns an acknowledgement to the client (flow 2).

The target stack creates a new entry in the routing table for the new connection. If the target stack has an existing entry in the routing table for the same client IP address, the target copies the Binding Update message information from the existing entry to the new entry. The target stack notifies the routing stack of the new connection using the existing VIPADIST NEWCONN message (flow 3).

The routing stack processes the VIPADIST NEWCONN and adds a new entry to its routing table for the new connection. Because the routing stack has already sent a Binding Update message to the client for the DVIPA, the routing stack does not send another Binding Update message. Instead, the routing stack copies the Binding Update message information from an existing routing table entry for the client into the new entry. The client completes the three-way handshake and establishes the TCP connection. Since the client has previously received a Binding Update message, the client transmits the acknowledgement directly to the target stack (flow 4). The acknowledgement contains a Type 2 routing header that contains the DVIPA as the final destination. The client transmits data directly to the target stack (flow 5). Packets sent by the client contain a Type 2 routing header that contains the DVIPA as the final destination.

Figure 6:
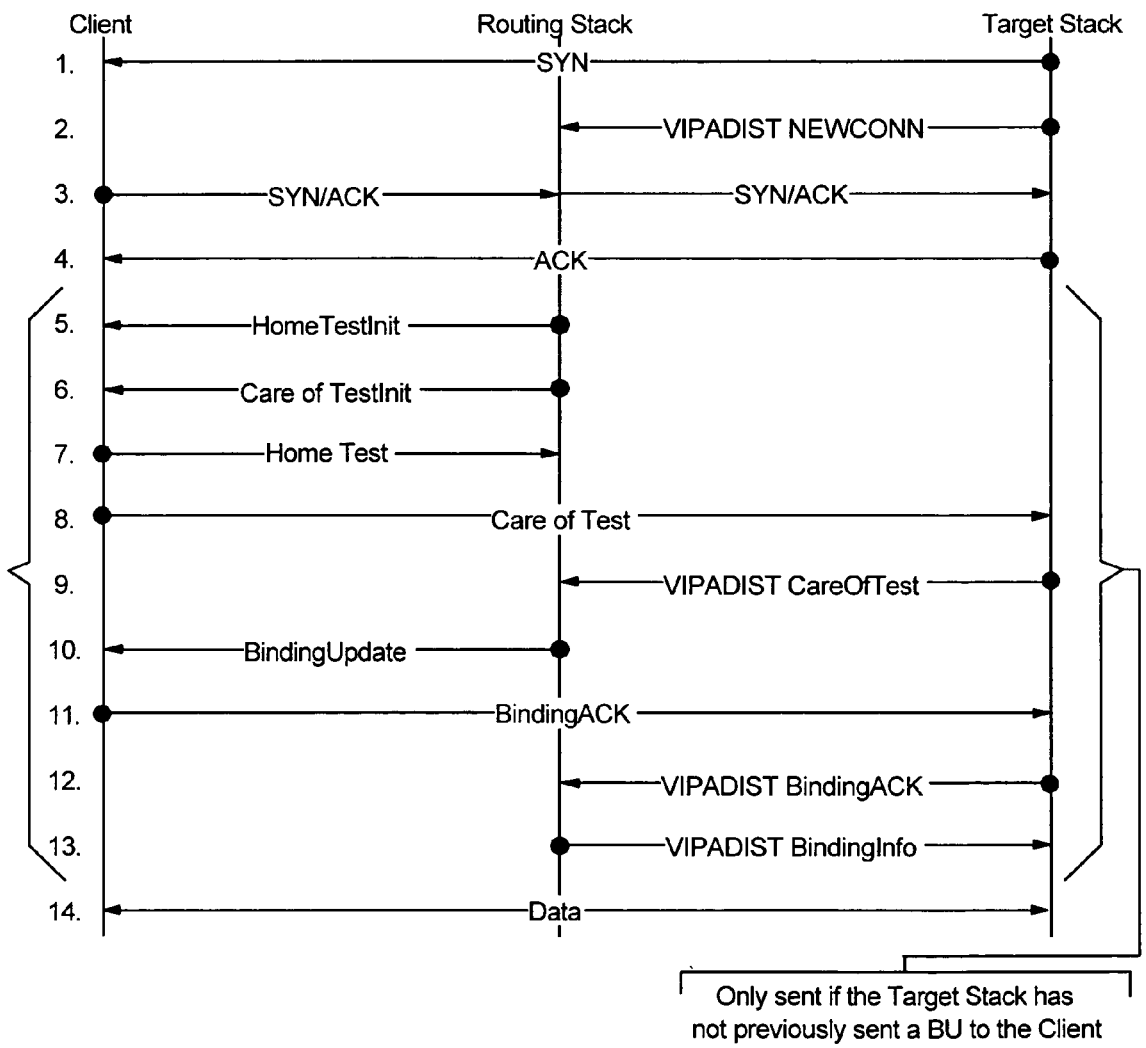

Referring now to FIG. 6, a flow diagram illustrating operations of an outbound connection according to some embodiments of the present invention will be discussed. When a target stack initiates an outbound connection to a client and the source IP address of the packet is a DVIPA, the target stack notifies the routing stack of the new connection. The routing stack creates a routing table entry for the new connection and stores it in the coupling facility. If this is the first connection entry for the client IP address and DVIPA pair, the routing stack transmits a Binding Update message to the client, specifying the DVIPA as the home address and the IP address of the target stack as the care-of address.

As illustrated in FIG. 6, the target stack establishes a new connection to the client (flow 1). The source IP address for the new connection is a DVIPA. The target stack creates a new entry in its routing table. If the target stack has an entry in its table for the same client IP address the target stack copies the Binding Update message information from the existing entry to the new entry. The target stack notifies the routing stack of the new connection using the existing VIPADIST NEW-CONN message (flow 2). The routing stack creates a new entry in its routing table. If the routing stack has an entry in its table for the same client IP address the target stack copies the Binding Update message information from the existing entry to the new entry.

The client receives the connection request. If the client has a binding cache entry for the DVIPA, the client responds directly to the target stack. However, in the flow illustrated in FIG. 6, the client does not have a binding cache entry. As a result, the client transmits the connection request acknowledgement to the DVIPA and the routing stack forwards the acknowledgement to the target stack (flow 3). The target stack completes the three-way handshake and establishes the TCP connection (flow 4). In this flow, the Routing stack has not sent a Binding Update message to the client. Thus, the routing stack is configured to transmit a Binding Update message to the client, redirecting the client to the selected target stack. As discussed above, before sending a Binding Update message, the routing stack must receive a Home Test message and a Care-of Test. The routing stack transmits a Home Test Init message to the client (flow 5), requesting the client send a Home Test message to the routing stack. The routing stack sets the source IP address on the Home Test Init message to the DVIPA.

The routing stack also transmits the Care-of Test Init message to the client on behalf of the Target Stack (flow 6). The routing stack sets the source IP address on the Care-of Test Init message to the IP address of the Target Stack. The client receives the Home Test Init message and responds with a Home Test message (flow 7). The client transmits the Home Test message to the Routing stack using the DVIPA as the destination IP address. The client receives the Care-of Test Init message and responds with a Care-of Test message (flow 8). The client transmits the Care-of Test message to the target stack using the IP address of the target stack as the destination IP address.

The target stack receives the Care-of Test message. Because the packet contains a mobility header, the target stack forwards the packet to the Routing stack for processing (flow 9). If a TCP header is also present, the target stack will also process the data received in the packet. Once the routing stack has received the Home Test message and Care-of Test messages, it transmits a Binding Update message to the client (flow 10). The Binding Update message specifies the DVIPA as the home address and the IP address of the target stack as the care-of address.

The client creates or updates its binding cache entry for the DVIPA, mapping the DVIPA to the IP address of the target stack. The routing stack requests the client respond with a binding acknowledgement, which the client does (flow 11). The client transmits the Binding Update message to the care-of address in the binding cache, i.e., the IP address of the target stack (flow 11). The target stack receives the binding acknowledgement. Since the IP packet contains a mobility header, the target stack forwards a copy to the routing stack (flow 12). If the IP packet contains a TCP header, the target stack also processes the data in the IP packet.

The routing stack updates its routing table entry to include the state information necessary to send Binding Update messages to the client. The routing stack transmits a VIPADIST binding info request to the target stack with this state information (flow 13). The target stack updates its routing table entry to include the Binding Update message state information so that it matches the entry in the routing table associated with routing table. Once the client processes the Binding Update message, the client transmits data directly to the target stack (flow 14). Packets sent by the client contain a Type 2 routing header that contains the DVIPA as the final destination.

Figure 7:
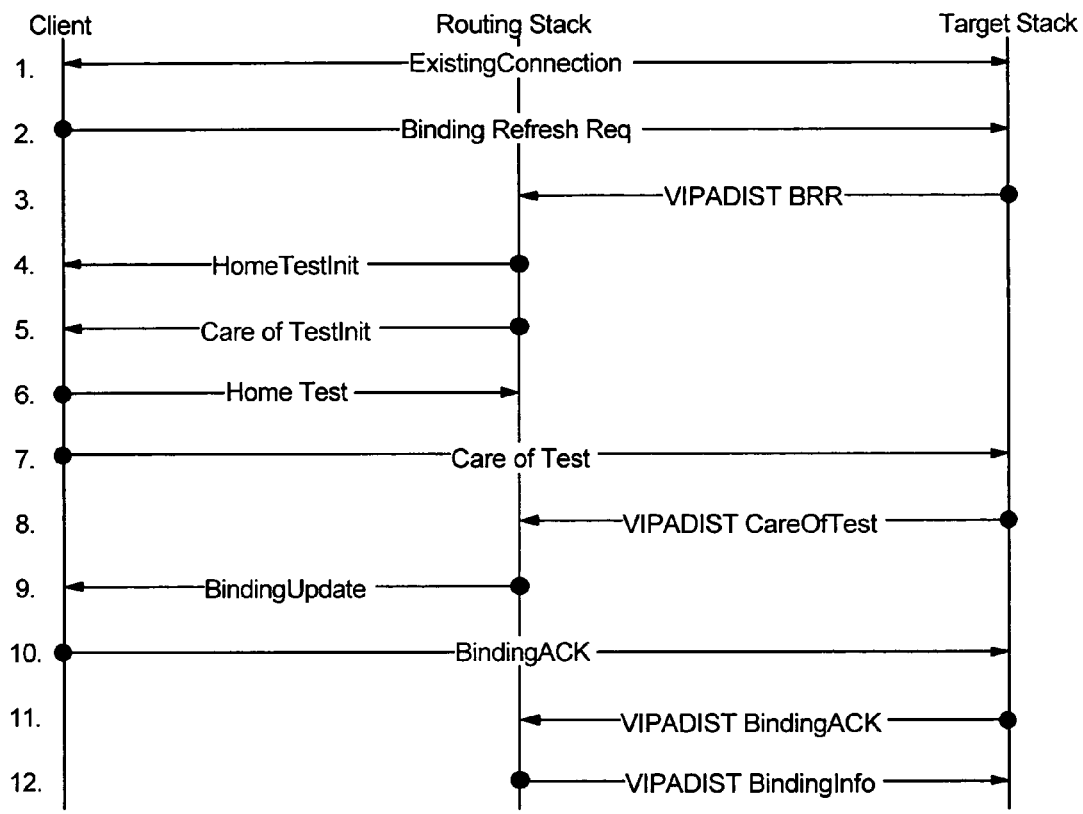

Referring now to FIG. 7, a flow diagram illustrating operations for receiving a binding refresh request according to some embodiments of the present invention will be discussed. In Mobile IP version 6, a Correspondent Node may request that a Mobile Node transmit a Binding Update message at any time by sending a binding refresh request. When mapped to Sysplex Distributor, the client may send a binding refresh request to the target stack at any time. Since the routing stack transmits the Binding Update message, the target stack must forward the binding refresh request to the routing stack for processing.

As illustrated in FIG. 7, one or more existing connections may exist between the client and an application listening on a DVIPA (flow 1). The client has a binding cache entry with a home address of the DVIPA and a care-of address of the target stack. The client is configured to request that binding cache be refreshed by transmitting a binding refresh request to the care-of address of the target stack (flow 2).

The Target Stack receives the binding refresh request message. Because the packet contains a Mobility Header, the target stack forwards the packet to the routing stack for processing (flow 3). If a TCP header is also present, the target stack will also process the data received in the packet. As the result of receiving a binding refresh request, the routing stack prepares to send a Binding Update message to the client. Before sending a Binding Update message, the Routing stack must receive a Home Test message and a Care-of Test message. The routing stack transmits a Home Test Init message to the client, requesting the client send a Home Test message to the routing stack (flow 4). The routing stack sets the source IP address on the Home Test Init message to the DVIPA.

The routing stack also transmits the Care-of Test Init message to the client on behalf of the target stack (flow 5). The routing stack sets the source IP address on the Care-of Test Init message to the IP address of the Target Stack. The client receives the Home Test Init message and responds with a Home Test message (flow 6). The client transmits the Home Test message to the routing stack using the DVIPA as the destination IP address. The client receives the Care-of Test Init message and responds with a Care-of Test message (flow 7). The client transmits the Care-of Test message to the Target Stack using the IP address of the target stack as the destination IP address.

The target stack receives the Care-of Test message. Because the packet contains a Mobility Header, the target stack forwards the packet to the routing stack for processing (flow 8). If a TCP header is also present, the target stack will also process the data received in the packet. Once the routing stack has received the Home Test message and Care-of Test messages, it transmits a Binding Update message to the client (flow 9). The Binding Update message specifies the DVIPA as the home address and the IP address of the Target Stack as the care-of address.

The client creates or updates its binding cache entry for the DVIPA, mapping the DVIPA to the IP address of the target stack. The routing stack requests the client respond with a binding acknowledgement, which the client does (flow 10). The client transmits the Binding Update message to the care-of address in the binding cache. The target stack receives the binding acknowledgement. Since the IP packet contains a Mobility Header, the target stack forwards a copy to the routing stack (flow 11). If the IP packet contains a TCP header, the target stack also processes the data in the IP packet. The routing stack updates its routing table entry to include the state information necessary to send Binding Update messages to the client. The routing stack transmits a VIPADIST Binding Info request to the target stack with this state information (flow 12). The target stack updates its routing table entry to include the Binding Update message state information so that it matches the entry in the routing table associated with the routing stack.

Figure 8:
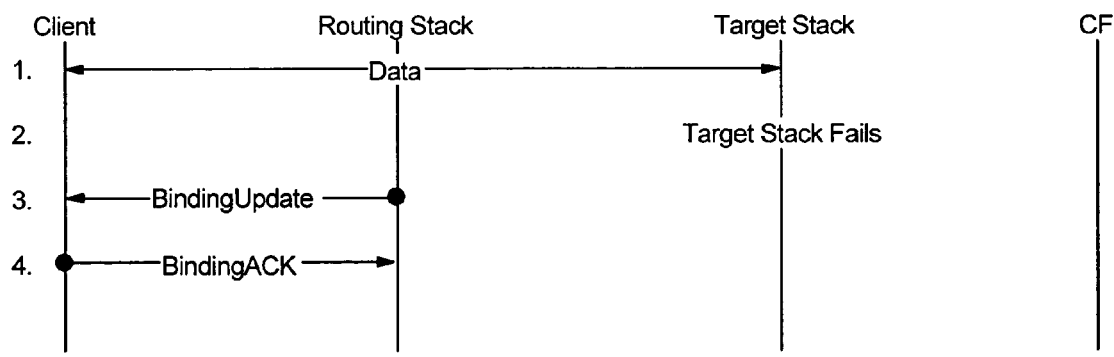

Referring now to FIG. 8, a flow diagram illustrating operations for a target stack failure according to some embodiments of the present invention will be discussed. One or more existing connections may exist between the client and an application listening on a DVIPA (flow 1). The client has a binding cache entry with a home address of the DVIPA and a care-of address of the target stack.

As illustrated in FIG. 8, the target stack may fail (flow 2). The routing stack is configured to recognize if the target stack is no longer operational. In addition to existing logic, the routing stack deletes each binding cache entry at the client that has the target stack as the care-of address. For each binding cache entry that the routing stack has created at the client, the routing stack transmits a Binding Update message with both the home address and the care-of address set to the DVIPA (flow 3). The client deletes the binding cache entry that maps the DVIPA to the IP address of the target stack. The routing stack requests the client acknowledge the Binding Update message. The client transmits a binding Acknowledgement directly to the DVIPA managed by the routing stack (flow 4).

Figure 9:
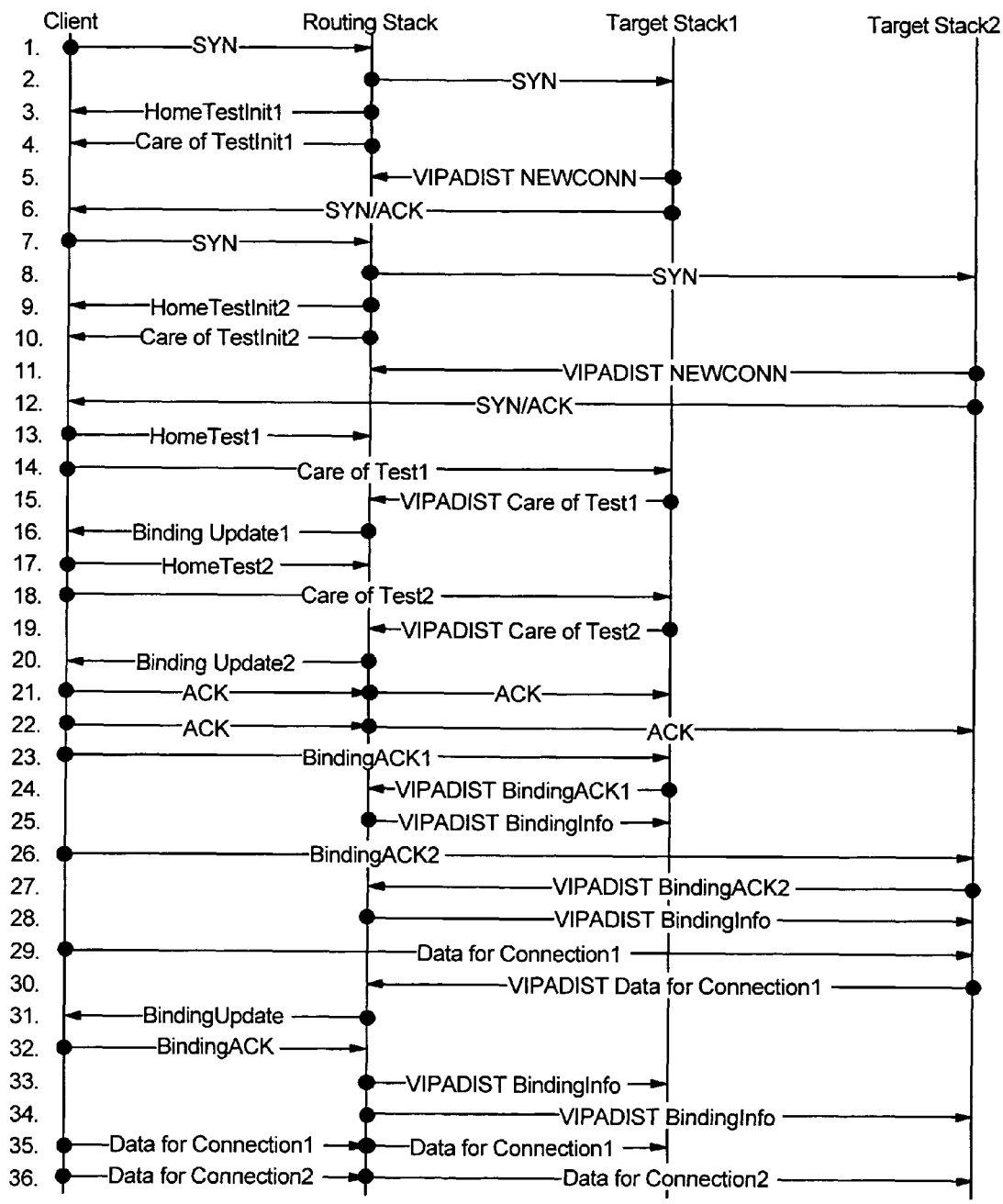

Referring now to FIG. 9, a flow diagram illustrating operations of systems according to some embodiments of the present invention when a single client is routed to two target stacks will be discussed. Embodiments of the present invention attempt to route parallel connections from a client to a DVIPA to the same Target Stack. However, it is possible that the client may establish parallel connections using different source IP addresses before the client receives a Binding Update message for the DVIPA. The client transmits these connection requests to the routing stack for processing. Because the source IP address and DVIPA pair do not match an existing connection table entry, the routing stack may select a different target stack for each connection request.

The Routing stack may transmit a unique Binding Update message to each unique client IP address that creates a Binding Cache Entry for the DVIPA. Each Binding Update message creates or updates the binding cache entry for the DVIPA with the result being the binding cache entry matches the last received Binding Update message. As a result, the client transmits all packets for a given DVIPA to one target stack, even when some of the connections terminate on a different target stack. To account for this possibility, the routing stack is configured to delete the binding cache entry on the client when the routing stack detects the problem. Once the client deletes the binding cache entry, the routing stack processes and forwards packets received from the client to the appropriate target stack.

As illustrated in FIG. 9, the routing stack receives a new connection request (flow 1) and the routing stack checks its routing table to see if there is an existing connection from the same client IP address in its routing table. If it is determined that there is an existing connection, the routing stack transmits the connection request to the same target stack as the existing connection(s). If it is determined that there is not an existing entry in the routing table, as is the case with this flow, the routing stack selects a new target Stack, Target Stack 1 illustrated in FIG. 9. The routing stack creates a new entry in the routing table for the new connection. The routing stack forwards the connection request to Target Stack 1 (flow 2).

The routing stack is configured to send a Binding Update message to the client, redirecting the client to Target Stack 1. Before sending a Binding Update message, the routing stack must receive a Home Test message and a Care-of Test message. The routing stack transmits a Home Test Init message to the client, requesting the client send a Home Test message to the Routing stack (flow 3). The Routing stack sets the source IP address on the Home Test Init message to the DVIPA. The routing stack also transmits the Care-of Test Init message to the client on behalf of the Target Stack (flow 4). The routing stack sets the source IP address on the Care-of Test Init message to the IP address of Target Stack 1.

In the meantime, the target stack 1 receives and processes the connection request. Target Stack 1 turns an acknowledgement to the client (flow 6). The Target Stack 1 adds an entry for the connection to routing table. Target Stack 1 notifies the routing stack that it has processed and accepted the new connection request (flow 5). The routing stack updates its entry in the routing table.

The client transmits a second connection request to the Routing stack for the same DVIPA but with a different source IP address (flow 7). When the routing stack receives the connection request, it checks its routing table to see if there is an existing connection from the same client IP address in its connection table. If it is determined that there is an existing connection, the routing stack transmits the connection request to the same Target Stack as the existing connection(s). If it is determined that there is not an existing entry in the routing table, as is the case with this flow, the routing stack selects a new Target Stack, Target Stack 2. The routing stack creates a new entry in the routing table for the new connection. The routing stack forwards the connection request to Target Stack 2 (flow 8).

The routing stack is configured to transmit a Binding Update message to the client, redirecting the client to Target Stack 2. Before sending a Binding Update message, the routing stack must receive a Home Test message and a Care-of Test. The routing stack transmits a Home Test Init message to the client, requesting the client send a Home Test message to the routing stack (flow 9). The routing stack sets the source IP address on the Home Test Init message to the DVIPA. The routing stack also transmits the Care-of Test Init message to the client on behalf of the Target Stack (flow 10). The routing stack sets the source IP address on the Care-of Test Init message to the IP address of Target Stack 2.

In the meantime, Target Stack 2 receives and processes the connection request and returns an acknowledgement to the client (flow 12). The Target Stack 2 adds an entry for the connection to its routing table. Target Stack 2 notifies the routing stack that it has processed and accepted the new connection request (flow 11). The routing stack updates its entry in the routing table.

The client receives the first Home Test Init message and responds with a Home Test message (flow 13). The client transmits the Home Test message to the Routing stack using the DVIPA as the destination IP address. The client receives the first Care-of Test Init message and responds with a Care-of Test message (flow 14). The client transmits the Care-of Test message to Target Stack 1 using the IP address of Target Stack 1 as the destination IP address.

Target Stack 1 receives the Care-of Test message. Because the packet contains a mobility header, the Target Stack forwards the packet to the routing stack for processing (flow 15). If the packet also contains data, the target stack will also process the data received in the packet. Once the Routing stack has received the Home Test message and Care-of Test messages, it transmits a Binding Update message to the client (flow 16). The Binding Update message specifies the DVIPA as the home address and the IP address of Target Stack 1 as the care-of address.

The client receives the second Home Test Init message and responds with a Home Test message (flow 17). The client transmits the Home Test message to the Routing stack using the DVIPA as the destination IP address. The client receives the second Care-of Test Init message and responds with a Care-of Test message (flow 18). The client transmits the Care-of Test message to Target Stack 2 using the IP address of Target Stack 2 as the destination IP address.

Target Stack 2 receives the Care-of Test message. Because the packet contains a mobility header, the target stack forwards the packet to the routing stack for processing (flow 19). If the packet also contains data, the target stack will also process the data received in the packet. Once the routing stack has received the Home Test message and Care-of Test messages, it transmits a Binding Update message to the client (flow 20). The Binding Update message specifies the DVIPA as the home address and the IP address of Target Stack 2 as the care-of address. The client completes the three-way handshake for the first connection and establishes the TCP connection. Since the client has not received a Binding Update message, the client transmits the acknowledgement to the Routing stack (flow 21). The Routing stack forwards the acknowledgement to Target Stack (flow 21).

The client completes the three-way handshake for the second connection and establishes the TCP connection. Since the client has not received a Binding Update message, the client transmits the acknowledgement to the Routing stack (flow 22). The routing stack forwards the acknowledgement to target stack 2 (flow 22). The client creates or updates its binding cache entry for the DVIPA, mapping the DVIPA to the IP address of Target Stack 1. The routing stack requests the client respond with a binding acknowledgement, which the client does (flow 23). The client transmits the binding acknowledgement to the care-of address in the binding cache, i.e., the IP address of Target Stack 1. Target Stack 1 receives the binding acknowledgement. Since the IP packet contains a mobility header, the target stack forwards a copy to the routing stack (flow 24). If the IP packet contains data, Target Stack 1 also processes the data in the IP packet.

The Routing stack updates its routing table entry to include the state information necessary to send Binding Update messages to the client. The routing stack transmits a VIPADIST Binding Info request to Target Stack 1 with this state information (flow 25). Target Stack 1 updates its routing table entry to include the Binding Update message state information so that it matches the entry in the routing table associated with the routing stack.

The client updates its binding cache entry for the DVIPA, mapping the DVIPA to the IP address of Target Stack 2. The Routing stack requests the client respond with a binding acknowledgement, which the client does (flow 26). The client transmits the binding acknowledgement to the care-of address in the binding cache, i.e., the IP address of Target Stack 2. Target Stack 2 receives the binding acknowledgement. Since the IP packet contains a mobility header, the target stack forwards a copy to the routing stack (flow 27). If the IP packet contains data, Target Stack 2 also processes the data in the IP packet. The Routing stack updates its routing table entry to include the state information necessary to send Binding Update messages to the client. The Routing stack transmits a VIPADIST Binding Info request to Target Stack 2 with this state information (flow 28). Target Stack 2 updates its routing table entry to include the Binding Update message state information so that it matches the entry routing table associated with the routing stack.

Once the client processes the second Binding Update message, the client transmits data for the first connection to the DVIPA directly to Target Stack 2 (flow 29). Packets sent by the client contain a Type 2 routing header that contains the DVIPA as the final destination. Target Stack 2 is not aware of the TCP connection from the client to the DVIPA. Since a Type 2 routing header is present and is not a request for a new connection, target stack 2 forwards the packet(s) to the routing stack (flow 30).

The routing stack is configured to recognize that the client has established parallel connections to two different Target Stacks. The routing stack requests the client delete the binding cache entry for the DVIPA by sending a Binding Update message to the client (flow 31), with the home address and the care-of address both set to the DVIPA.

The client deletes its binding cache entry. The routing stack requests the client acknowledge the Binding Update message. As a result, the client transmits a binding acknowledgement to the routing stack (flow 32). The routing stack updates its routing table entry so that it forwards packets from the client's first IP address to the DVIPA using the 4-tuple, i.e., source address, destinations address and port numbers. The routing stack transmits a VIPADIST Binding Info request to Target Stack 1 with this state information (flow 33). Target Stack 1 updates its routing table entry to include the Binding Update message state information so that it matches the entry the routing table associated with the routing stack.

The Routing stack updates its routing table entry so that it forwards packets from the client's second IP address to the DVIPA using the 4-tuple. The routing stack transmits a VIPADIST Binding Info request to Target Stack 2 with this state information (flow 34). Target Stack 2 updates its routing table entry to include the Binding Update message state information so that it matches the entry in the routing table associated with the routing stack. When the client transmits subsequent data packets to Target Stack 1, the client sets the destination IP address to the DVIPA. The Routing stack receives the packets and forwards them to Target Stack 1 using the 4-tuple information from the routing table entry (flow 35). Similarly, when the client transmits subsequent data packets to Target Stack 2, the client sets the destination IP address to the DVIPA. The routing stack receives the packets and forwards them to Target Stack 2 using the 4-tuple information from the routing table entry (flow 36).

Figure 10:
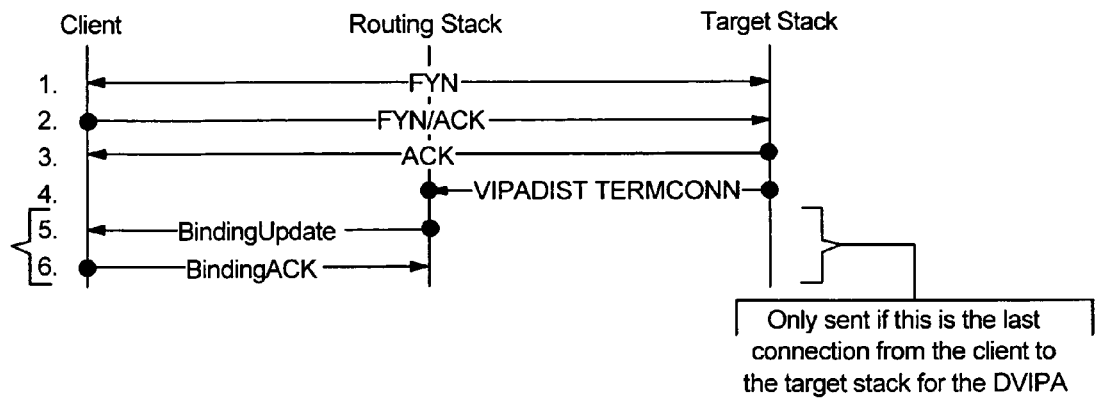

Referring now to FIG. 10, a flow diagram illustrating operations for terminating connections according to some embodiments of the present invention will be discussed. When the last connection from a client to a DVIPA terminates, the routing stack may be configured to delete the binding cache entry at the client. The binding cache entry may be deleted by sending a Binding Update message with both the home address and the care-of address set to the DVIPA. In some embodiments of the present invention, the routing stack may request the client delete binding cache entry immediately, or the routing stack may defer the request until the timed affinity between the client and the Target Stack expires.

As illustrated in FIG. 10, the target stack may be configured to terminate an existing connection and transmit a connection termination request to the client (flow 1). The client acknowledges the connection termination request (flow 2). Since the client has a binding cache entry for the DVIPA, the client transmits the acknowledgement to the target stack. The request contains a Type 2 routing header that contains the DVIPA. The target stack completes the connection termination (flow 3). Once the connection is terminated, the target stack removes the entry for this connection from its routing table. The target stack notifies the routing stack that the connection no longer exists (flow 4). The routing stack removes the connection entry from its routing table. If this is the last routing table entry for client and the DVIPA, the routing stack may delete the binding cache entry in the client for the DVIPA. The routing stack transmits a Binding Update message to the client, with the home address and the care-of address both set to the DVIPA (flow 5). The client deletes its binding cache entry. The routing stack requests the client acknowledge the Binding Update message. As a result, the client transmits a binding acknowledgement to the routing stack (flow 6).

Figure 11:
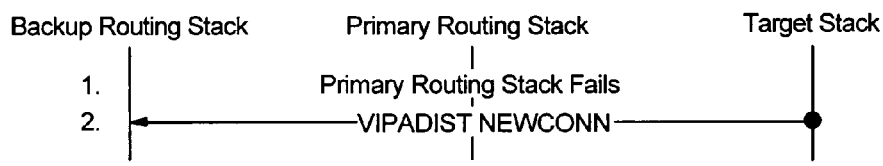

Referring now to FIG. 11, a flow diagram illustrating a routing stack failure according to some embodiments of the present invention will be discussed. In some embodiments of the present invention, when the primary routing stack fails, a backup routing stack may activate the DVIPA and takeover the routing stack functions. The target stack may be configured to determine that a new Routing stack has assumed ownership of the DVIPA and transmit a VIPADIST NEWCONN message for each entry in its routing table The routing stack may be configured to rebuild its copy of the routing table so it contains all entries for each target stack. The target stack includes the Binding Update message information from its routing table entry in the VIPADIST NEWCONN. The presence of this information enables the routing stack to recreate this information in its table.

As illustrated in FIG. 11, the primary routing stack fails (flow 1). In some embodiments of the present invention, the backup routing stack may activate the DVIPA responsive to the failure of the primary routing stack. The target stack notifies the backup routing stack about each entry in its routing table. The Target Stack includes any Binding Update message information for the entry in the NEWCONN message sent to the backup routing stack (flow 2). The routing stack updates its copy of the routing table so that it contains an entry for all connections reported by the target stacks, including the Binding Update message information.

Figure 12:
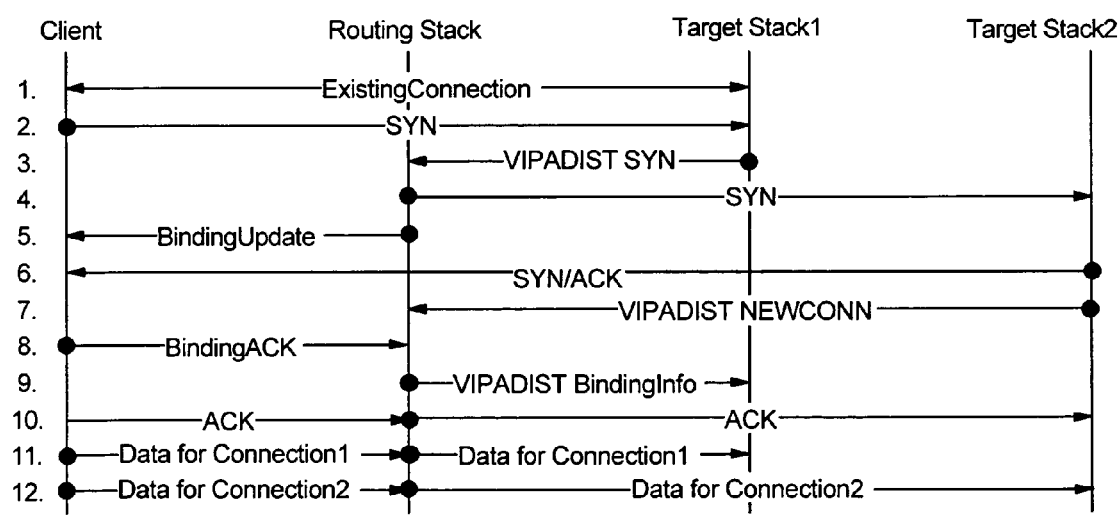

Referring now to FIG. 12, a flow diagram illustrating operations for establishing a new connection request with not application on a target stack according to some embodiments of the present invention will be discussed. Once a client receives and processes a Binding Update message, the client transmits all subsequent packets to the target stack until the binding cache entry expires or the routing stack explicitly deletes the binding cache entry. This includes packets for existing connections as well as new connection requests.

Since the routing stack does not typically see the new connection request, the routing stack cannot ensure that an application on the target stack is listening on the destination port. If an application is not listening, the target stack must forward the connection request to the routing stack for processing. The routing stack may select an appropriate target stack on which the target application is running and delete the binding cache entry at the client. Subsequent packets sent from the client to applications listening on the DVIPA will be sent to the routing stack for forwarding.

As illustrated in FIG. 12, a connection already exists between the client and target stack 1. However, the client wishes to establish a new connection to an application listening on the DVIPA. The client has a Binding Cache entry for the DVIPA that has a care-of address for Target Stack 1. Accordingly, the client transmits the new connection request directly to Target Stack 1 (flow 2). Target Stack 1 receives the connection request. The connection request contains a Type 2 routing header but Target Stack 1 does not have an application listening on the destination port. Thus, target stack 1 forwards the connection request to the Routing stack for processing (flow 3). The routing stack selects a target stack for the destination port listening on the DVIPA, in this case Target Stack 2. The routing stack creates a new entry in its routing table and forwards the connection request to Target Stack 2 (flow 4).

The routing stack is configured to recognize that the client has established parallel connections to two different Target Stacks, i.e., target stacks 1 and 2. The routing stack requests the client delete the binding cache entry for the DVIPA by sending a Binding Update message to the client, with the home address and the care-of address both set to the DVIPA (flow 5).

In the meantime, target stack 2 receives and processes the connection request. Target Stack 2 transmits an acknowledgement to the client (flow 6). Target stack 2 adds an entry for the connection to routing table. Target stack 2 notifies the routing stack that it has processed and accepted the new connection request (flow 7). The routing stack updates its entry in the routing table.

The client deletes its binding cache entry. The routing stack requests the client acknowledge the Binding Update message. As a result, the client transmits a binding acknowledgement to the routing stack (flow 8). The routing stack updates its routing table entry so that it forwards packets from the client's first IP address to the DVIPA using the 4-tuple. The routing stack transmits a VIPADIST Binding Info request to target stack 1 with this state information (flow 9). Target stack 1 updates its routing table entry to include the Binding Update message state information so that it matches the entry in the routing table associated with the routing stack.

The client completes the three-way handshake and establishes the TCP connection. Since the client has deleted its binding cache Entry, the client transmits the acknowledgement to the routing stack (flow 10) and the routing stack forwards the acknowledgement to target stack 2 (flow 10). When the client transmits subsequent data packets to target stack 1, the client sets the destination IP address to the DVIPA (flow 11). The routing stack receives the packets and forwards them to target stack 1 using the 4-tuple information from the routing table entry (flow 11). When the client transmits subsequent data packets to target stack 2, the client sets the destination IP address to the DVIPA (flow 12). The routing stack receives the packets and forwards them to target stack 2 using the 4-tuple information from the routing table entry.

As discussed briefly above with respect to FIGS. 1 through 12, some embodiments of the present invention provide methods, systems and computer program products for load balancing using Mobile IP Version 6 concepts. In particular, a routing stack receives a connection request from a new client and selects the appropriate target stack, for example, the target stack providing the best performance. After forwarding a request for a new connection, for example, the SYN request, to the target stack, the routing stack transmits a Binding Update message to the client identifying the DVIPA as the home address and the IP address of the target stack as the care-of address. When the client receives the Binding Update message, it creates a binding cache entry, which effectively maps the DVIPA (the home address) to IP address of the target stack (the care-of address). Thus, according to some embodiments of the present invention the client can transmit packets destined for the DVIPA directly to the IP address of the target stack, bypassing the routing stack completely. Accordingly, delays associated with Cisco Forwarding Agents and XCFs may be reduced or eliminated.

According to some embodiments of the present invention, the majority of the Mobile IP Version 6 processing is performed at the routing stack (home agent) and not at the target stack (mobile node). This is different from conventional uses of Mobile IP Version 6 processing, where most Mobile IP Version 6 processing is performed at the mobile node and not the home agent.

Using Mobile IP Version 6 for optimizing Sysplex Distributor has certain implications that make it suitable for some types of traffic and less suitable for others. As a result, Mobile IP Version 6 route optimizations may include a switch to enable and/or disable the functionality. For example, Mobile IP Version 6 route optimizations may be well suited to applications that establish long-running connections. Mobile IP Version 6 may require several messages to update the binding cache at a client. For long-running applications, the savings at the routing stack from avoiding processing packets sent from the client to the target stack typically outweighs the overhead of creating and maintaining a binding cache entry at the client.

On the other hand, for short-lived connections, the benefits of removing the routing stack from the data path may be less than the additional overhead of the Mobile IP Version 6 flows. However, a single Binding Update message is sufficient to redirect multiple short-lived connections from the same client to the same Target Stack. If the same client establishes a series of short-lived connections to the same DVIPA, such as an HTTP client might do when connecting to a web server, then the savings may outweigh the additional overhead of the Mobile IP Version 6 flows.

As discussed above, connections according to embodiments of the present invention are distributed based on the source/destination address pair (2-tuple). As a result, the same target stack typically processes all concurrent connections between a client and a given DVIPA. In contrast, connections in Mobile IP Version 4 are distributed based on the 4-tuple, source and destination addresses as well as port numbers. As a result, a different Target Stack may process each individual connection between a client and a given DVIPA. Furthermore, in Mobile IP Version 4, the routing stack must process each data packet unless Cisco Forwarding Agents are used. For Cisco customers who do not use the Cisco Forwarding Agents and for non-Cisco customers, the routing stack typically processes the data packets. Some embodiments of the present invention discussed herein does not require the support in intermediate routers and, as such, works with routers supplied by all vendors. Furthermore, embodiments of the present invention do not require Mobile IP version 6 Correspondent Node support in the client.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of load balancing using Mobile Internet Protocol (IP) Version 6, comprising:
receiving, from a client, a request for a connection at a routing stack;
transmitting, from the routing stack, the request for the connection to the selected target stack;
receiving, at the routing stack, notification from the target stack that the connection request has been accepted by the target stack;
updating a routing table at the routing stack, wherein updating includes updating the routing table at the routing stack to indicate that the target stack has accepted the connection request responsive to the received notification;
transmitting, from the routing stack, a Mobile IP Version 6 Home Test Init message to the client, the Home Test Init message including a request that the client return a Mobile IP Version 6 Home Test message to the routing stack;
receiving the Home Test message at the routing stack from the client responsive to the transmitted Home Test Init message;
transmitting, from the routing stack or the target stack, a Mobile IP Version 6 Care-of Test Init message to the client for the target stack, a source IP address of the Care-of Test Init message being set to the IP address of the target stack;
receiving, at the target stack, a Care-of Test message from the client responsive to the Care-of Test Init message, wherein the Care-of Test message includes a mobility header indicating that a copy of the Care-of Test message should be forwarded to the routing stack;
transmitting, from the target stack, the copy of the Care-of Test message to the routing stack;
establishing, at the client, the connection between the client, the routing stack and the target stack so as to allow direct communication between the client and the target stack;
transmitting, from the client, to the routing stack an indication that the connection has been established;
receiving the transmitted indication at the routing stack;
forwarding the transmitted indication to the target stack;
transmitting, from the routing stack, a Mobile IP Version 6 Binding Update message to the client responsive to the received request, the Binding Update message identifying the selected target stack so as to allow the client to communicate directly with the target stack, bypassing the routing stack;
wherein transmitting the Binding Update message comprises transmitting the Binding Update message to the client once both the Care-of Test message and the Home Test message have been received at the routing stack;
wherein the method is implemented using z/OS Version 1 Revision 6;
wherein the Binding Update message comprises a home address of the connection as an internet protocol address associated with the routing stack and a care-of address of the connection as an IP address associated with the target stack so as to allow the client to create a binding cache entry that maps the IP address associated with the routing stack to the IP address associated with the target stack;
wherein the IP address associated with the routing stack comprises a virtual IP address (VIPA);
wherein said transmitting is preceded by enabling Mobile IP Version 6 optimizations on the VIPA;
creating, at the client, the binding cache entry that maps the home address to the care-of address so as to allow direct communication between the client and the target stack;
transmitting, from the client, a binding acknowledgment directly to the target stack bypassing the routing stack;

receiving, at the routing stack, a copy of the binding acknowledgment from the target stack;

updating a routing table associated with the routing stack to include state information; and transmitting a binding information request to the target stack including the state information so as to allow the target stack to update a routing table associated with the target stack;

wherein the Binding Update message comprises a first Binding Update message, and the method further comprising:

receiving, from the routing stack, a second Binding Update message at the client, the second Binding Update message indicating that the established connection should be terminated; and deleting the binding cache entry associated with the connection at the client responsive to second Binding Update message;

receiving, at the routing stack, mobile IP version 6 messages from the target stack so as to allow the routing stack to maintain the routing table associated with the routing stack that is substantially similar to the routing table associated with the target stack;

receiving, at the routing stack, a notification of a new connection request at the target stack from the client; and copying, at the routing stack, Binding Update message information associated with the connection from the routing table associated with the routing stack;

wherein the method further comprises:

receiving, at the routing stack, a notification of a new connection request at the client from the target stack;

determining, at the routing stack, if an entry for the new connection exists in the routing table;

copying Binding Update message information associated with the existing connection from the routing table if it is determined that the entry exists;

transmitting, from the routing stack, a third Binding Update message to the client if it is determined that the entry does not exist, the third Binding Update message identifying a second selected target stack for the new connection so as to allow the client to communicate directly with the second selected target stack bypassing the routing stack; and transmitting, from the client, a binding refresh request to the target stack, the binding refresh request including a request to send another Binding Update message from the target stack;

wherein the method further comprises:

detecting, at the routing stack, a problem with the target stack;

deleting the binding cache entry at the client responsive to the detected problem; and transmitting, from the routing stack, a fourth Binding Update message to the client, the fourth Binding Update message indicating that the care-of address and the home address should both be set to the VIPA so as to delete the binding cache entry at the client and to allow direct communication between the client and the routing stack.

* * * * *